March 3, 1964  A. AMBLI  3,122,764
DOCK PLATFORM
Filed Nov. 14, 1960 2 Sheets-Sheet 1

INVENTOR
ANDREW AMBLI
BY
Williamson + Palmatier
ATTORNEYS

March 3, 1964 A. AMBLI 3,122,764
DOCK PLATFORM
Filed Nov. 14, 1960 2 Sheets-Sheet 2

INVENTOR
ANDREW AMBLI
BY
Williamson + Palmatier
ATTORNEYS

United States Patent Office 3,122,764
Patented Mar. 3, 1964

3,122,764
DOCK PLATFORM
Andrew Ambli, 2376 Hamline Ave. N., St. Paul, Minn.
Filed Nov. 14, 1960, Ser. No. 68,770
3 Claims. (Cl. 14—71)

This invention relates to apparatus to be used in connection with loading docks wherein trucks and other similar vehicles are loaded and unloaded, and more particularly relates to a platform for bridging between the loading dock and the deck of a truck.

Platforms of this general nature for bridging between the loading dock and the deck of a truck have been known but have had distinct disadvantages. Whereas for the most part a simple sheet of steel plating is employed for bridging between the loading dock and a truck deck, other more permanent types of fixtures and apparatus have been employed. These other apparatus or fixtures have been unduly complicated and unduly expensive as compared to their utility and in many instances such known apparatus have not performed the functions desired.

With these comments in mind it is to the elimination of these and other disadvantages to which the present invention is directed, along with other new and desirable features.

An object of my invention is to provide a new and improved platform of simple and inexpensive construction and operation for bridging between a loading dock and the deck of a truck.

Another object of my invention is to provide a novel platform for bridging between a loading dock and the deck of a truck and which is constructed to permit hand carts and the like to readily pass thereover and which may be tilted upwardly to an out-of-the-way position to allow the trucks to be properly positioned in closely spaced relation with the loading dock without causing any damage to the bridging platform.

Another object of my invention is the provision of a platform for bridging between a loading platform and the deck of a truck and which platform is of simple construction but which may be raised to a tilted, out-of-the-way position and which may also be retracted behind the edge of the dock or projected forwardly onto the truck deck so as to permit stripping of the truck load at the rear of the truck when no access into the body of the truck and on the deck thereof may be obtained until some of the freight has been stripped.

These and other objects and advantages of my invention will more fully appear from the following description made in connection with the accompanying drawings wherein like reference characters refer to the same or similar parts throughout the several views and in which.

Figure 1:
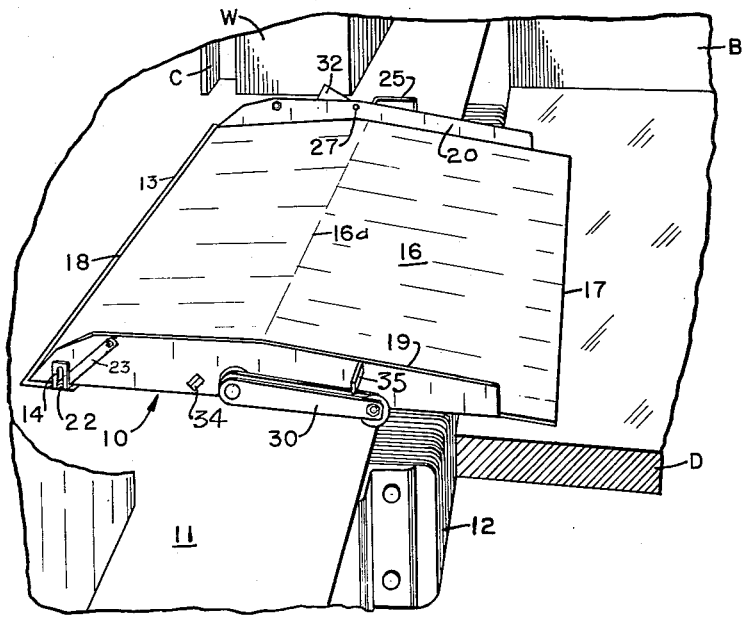
FIG. 1 is a perspective view of the platform shown in bridging relation with respect to the loading dock and the deck of a truck.

One form of the present invention is shown in the drawings and is described herein.

The platform is indicated in general by numeral 10 and is used in connection with a loading dock 11 which will ordinarily be constructed of concrete and will extend outwardly of the building wall W and be provided with resilient bumpers 12 against which the deck structure D of the truck body B abuts when the truck is properly located for loading or unloading. Ordinarily the level of the loading dock 11 and of the bumpers 12 is as nearly identical to the level of the truck deck as is possible from the ground or apron adjoining the loading dock. Of course there will be some variance as compared to certain trucks and of course the deck structure of a truck may vary in elevation depending upon the load carried by the truck. The upper surface of the loading dock 11 may be sloped outwardly from the inner side of the wall W to which may be secured the door-guiding channels C. Of course if the loading dock 11 is slightly sloped, water will run off the loading dock instead of accumulating thereon or running into the adjoining warehouse area.

The loading dock 11 is provided with an upwardly opening recess-defining channel 13 which extends parallel to the edge of the loading dock. The channel 13 has at its opposite ends, a pair of upright rigid standards 14 the bases of which are bolted therein, which extend upwardly above the loading dock. The standards 14 are provided with upright elongate slots 15 therein which extend both above and below the level of the upper surface of the loading dock.

Figure 4:
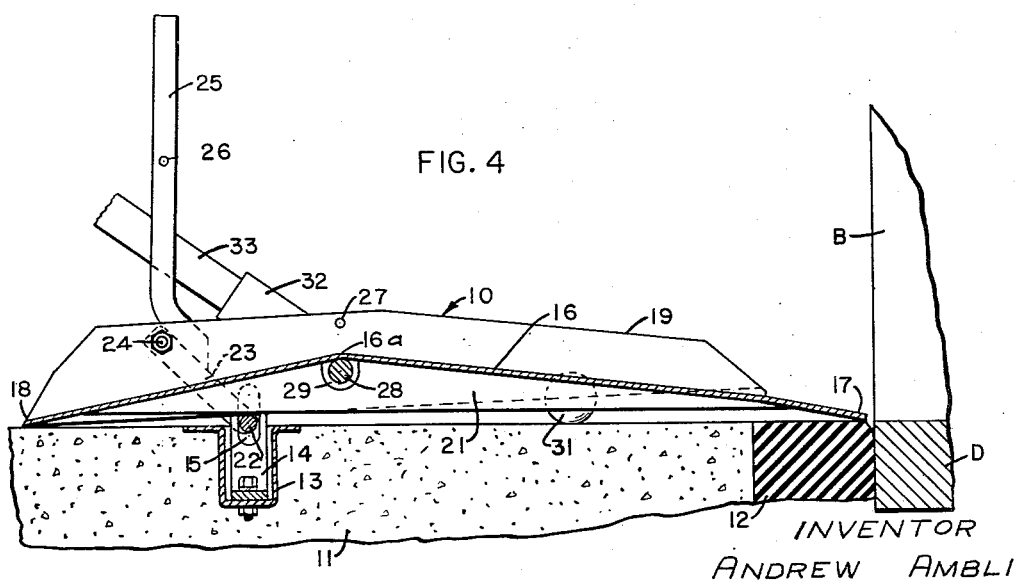
FIG. 4 is a section view taken approximately at 4—4 of FIG. 2 and showing the platform retracted from the position shown in FIG. 3.

The platform 10 comprises a rigid and substantially flat but slightly arched plate 16 which has front and rear edges 17 and 18 respectively which under normal circumstances will respectively rest upon the deck D of the truck and upon the loading dock 11. As seen in FIG. 4, the plate 16 is slightly bent at 16a, generally intermediate the front and rear edges 17 and 18 so that when the plate 16 is oriented generally horizontally, the plate slopes upwardly in a forward direction from the rear edge 18 and also slopes upwardly in a rearward direction from the forward edge 17. As will be hereinafter more fully pointed out, the front and rear edges of the plate will normally engage the truck deck and the loading dock and the area of the plate 16 immediately adjacent the rear edge 18 thereof lies in close proximity with the upper surface of the loading dock.

The platform 10 also has a pair of rigid upstanding retaining walls 19 and 20 rigidly affixed as by welding to the opposite ends of plate 16. In addition, the plate 16 is reinforced by a plurality of elongate vertically oriented webs or ribs 21 which are affixed as by welding to the bottom surface of plate 16.

Figure 3:
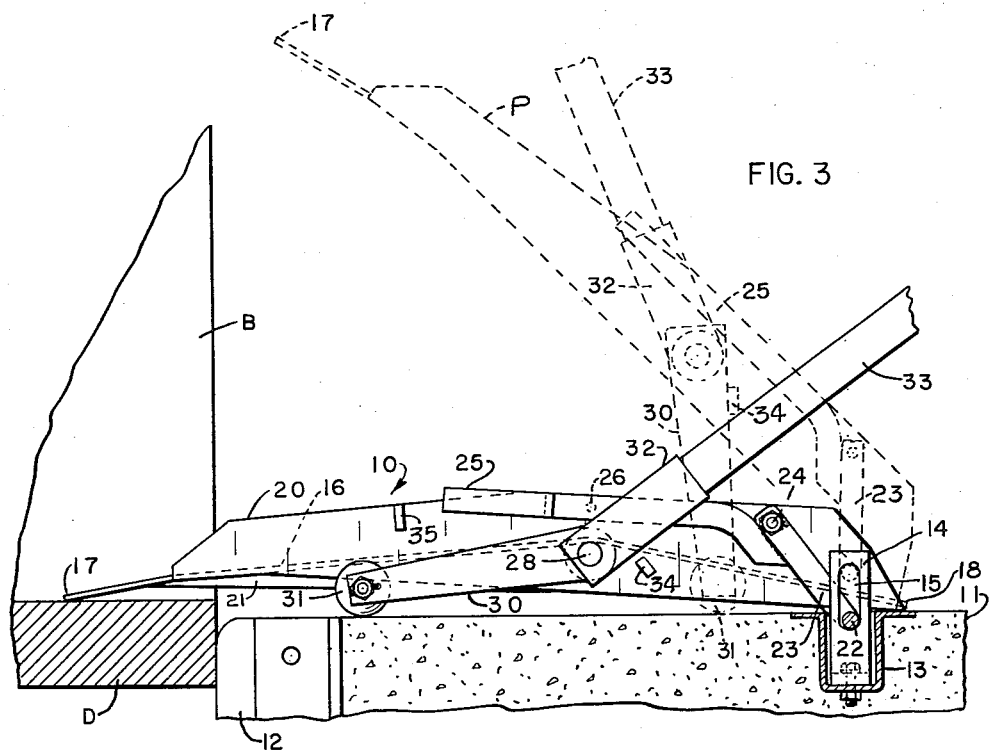
FIG. 3 is a side elevation view with the leading dock and truck deck shown in section.

Means are provided for securing plate 16 to the upright standards 14 and providing for forward and rearward shifting of the plate to the positions shown in FIGS. 3 and 4 respectively. A control shaft 22 underlies the plate 16 adjacent the rear edge 18 thereof and also lies in the channel 13. The ends of shaft 22 extend into the slots 15 of the standards 14 and provide pivot means connecting the standards to a pair of control links 23 which are affixed to the shaft 22 and extend forwardly and upwardly therefrom in normal position. The upper ends of links 23 are pivotally secured by bolts 24 to the end plates 19 and 20 respectively. A handle 25 is affixed as by welding to one of the links 23 and normally extends along the retaining wall 20 in the position shown in FIG. 3. The handle 25 has a lug 26 thereon which normally projects a suitably provided aperture 27 in the plate 20 to prevent the handle 25 from swinging. Lug 26 may be retracted from the apertures 27 by merely flexing the handle 25.

By swinging the handle 25 upwardly from the position shown in FIG. 3 to the position shown in FIG. 4, the platform 10 will be retracted from the position shown in FIG. 3 to the position shown in FIG. 4. As the handle 25 is swung upwardly, the links 23 are swung clockwise as viewed in FIG. 3, and the rear edge 18 of the plate 16 is lifted slightly and shifted rearwardly. In this position of the platform 10, the forward edge 17 of the plate 16 will be disposed at the outer edge of the bumper 12 so that the platform 10 will not engage the truck deck D whatsoever, but will be disposed in close proximity therewith. In the event that the truck body B is filled with freight to the edge of the deck D, a portion of the freight will be stripped off before the platform 10 is shifted forwardly into its normal operation position as shown in FIGS. 1 and 3.

Figure 2:
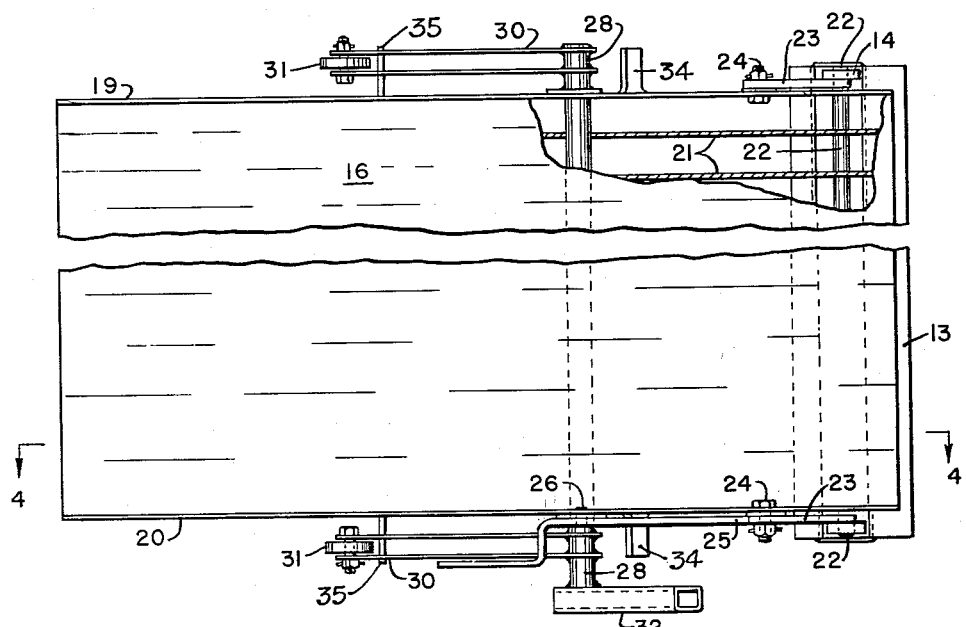
FIG. 2 is a top plan view partly broken away for clarity of detail.

Means are also provided for tilting the platform 10 upwardly to the dotted position P shown in FIG. 3. In the form shown, such means include a rocker shaft 28 underlying the plate 16 and disposed substantially intermediate the front and rear edges thereof. The shaft 28 extends through bearing apertures 29 in each of the ribs 21 and in end plates 19 and 20. A pair of lift arms 30 are affixed to opposite ends of shaft 28 and extend forwardly therefrom. As will be seen in FIG. 2, the lift arms are bifurcated and are provided with rollers 31 at their lower ends for readily and easily moving along the loading dock. One end of shaft 28 is provided with a handle-receiving socket 32 into which may be extended an elongate bar-type handle 33 which may also be removed and stored in an out-of-the-way place while the platform 10 is in use.

A pair of rigid stops 34 are respectively affixed to the plates 19 and 20 for engaging the lift arms 30 when the arms are swung to an upright position as seen in dotted lines in FIG. 3. The stops 34 prevent additional counter-clockwise swinging of the lift arms and thereby cooperate with the lift arms in holding the plate 16 in an upwardly tilted position.

Additional stops 35 are also affixed to plates 19 and 20 to prevent the lift arms 30 from swinging upwardly from the position shown in FIG. 1. The lift arms 30 and rollers 31 are thereby kept in a downward, out-of-the-way position when the plate 16 is substantially horizontally oriented.

When the platform 10 is in its forwardly shifted position, as seen in FIG. 3, the handle 33 may be inserted into the socket 32 and swung counter-clockwise so as to raise the platform to the dotted position P shown. It will be noted that as the plate 16 is lifted, the ends of shaft 22 move upwardly into slot 15 of standard 14 and in this position, the front edge 17 of the plate is disposed upwardly from and also rearwardly from the front bumper 12 so that the plate 16 will not be bumped nor will it otherwise interfere with a truck body B as the truck is being backed against the loading dock and bumper 12.

After the deck D of the truck is positioned as seen in FIG. 3 (or slightly higher or slightly lower than the position shown), the handle 33 is then swung to its full line position again to then lower the front edge 17 of the plate onto the truck deck D.

In the event that some of the freight must be stripped before the plate 16 can be inserted into the truck body B in the fashion shown in FIG. 3, the platform 10 will be retracted to the position shown in FIG. 4 before the truck is moved into place. Here again, there is no interference between the platform 10 and the truck body B or deck D.

It will be noted that when the platform 10 is in the position shown in FIG. 4, the rear portion of the plate 16 lies quite close to the level of the loading dock 11, and this is also true after the platform 10 is shifted forwardly onto the truck deck.

When the platform 10 is to be shifted forwardly from the position shown in FIG. 4 to that shown in FIG. 3, the handle 33 may be inserted into the socket 32 and swung so as to slightly lift the forward edge of the plate 16, and while this is being accomplished, the handle 25 is held in its upright position. When the front edge 17 of the plate is lifted sufficiently high so as to clear the top surface of the deck D, the handle 25 may be released and if the lifting on handle 33 is continued, the platform 10 will shift forwardly, whereupon the handle 33 may then be lowered so as to lower the front edge 17 onto the deck D. The platform 10 is then ready for normal use.

It will, of course, be understood that various changes may be made in the form, detail, arrangement and proportion of the parts without departing from the scope of my invention which consists of the matter described herein and set forth in the appended claims.

What I claim is:

1. In combination with a loading dock having an edge and having an elongate recess extending along and spaced from the edge, a platform for bridging over the edge of the loading dock and the deck of a truck and including a rigid plate overlying said recess and having front and rear edges to respectively rest upon the loading dock and truck deck, a pair of vertically slotted standards anchored in said recess of the dock and extending upwardly therefrom, a control shaft underlying the plate in spaced relation from said rear edge and said shaft lying in said recess with the ends thereof extending into the slots of said standards for vertical movement therein, a pair of forwardly and upwardly inclined control links respectively affixed to said shaft adjacent opposite ends thereof and having upper ends, means pivotally securing the upper ends of said control links to the plate, handle means for turning said shaft and swinging said links to shift the plate in a rearward direction and means for lifting the plate for tilting the same in a forwardly and upwardly inclined direction, the ends of said shaft moving in the slots as the plate is tilted.

2. In combination with a loading dock having an edge and having an elongate recess extending along and spaced from the edge of a platform for bridging over the edge of the loading dock and the deck of a truck and including a rigid plate overlying said recess and having front and rear edges to respectively rest upon the loading dock and truck deck, a pair of vertically slotted standards anchored in said recess of the dock and extending upwardly therefrom and a control shaft underlying the plate in spaced relation from said rear edge and said shaft lying in said recess with the ends thereof extending into the slots of said standards and for vertical movement therein, a pair of forwardly and upwardly inclined control links respectively affixed to said shaft adjacent opposite ends thereof and having upper ends, means pivotally securing the upper ends of said control links to the plate to permit cooperative swinging of said links and turning of the shaft with respect to the dock and with respect to the plate to facilitate shifting of the plate in a rearward direction, and means for lifting the plate for tilting the same in a forwardly and upwardly inclined direction, the ends of said shaft moving in the slots as the plate is tilted.

3. A platform for bridging between a loading dock and the deck of a truck, comprising a rigid plate having front and rear edges to respectively rest upon the truck deck and loading dock and also having opposite side edges, a pair of anchor bases respectively disposed adjacent opposite side edges of the plate and forwardly of the rear edge thereof and adapted to be affixed to the loading dock in a predetermined position, a pair of forwardly and upwardly inclined control links respectively disposed adjacent the opposite side edges of the plate, said links having lower ends disposed adjacent the anchor bases and also having upper ends, pivot means connecting the lower ends of said links to the adjacent anchor bases to permit fore-and-aft swinging of said links with respect to said bases, pivot means connecting the upper ends of said links to said plate adjacent the side edges thereof to permit fore-and-aft swinging of said links with respect to the plate, means rigidly affixed to each of said links and rigidly affixing said links in fixed relation with each other to require identical swinging of said links, said plate being movable, adjacent the rear edge thereof, rearwardly and upwardly along the arc of swinging of said links about the pivot adjacent the lower ends of said links, and the rear edge of said plate being engageable with the dock in both rearwardly swung and forwardly swung positions of said links, and means for tilting the same in a forwardly and upwardly inclined direction.

References Cited in the file of this patent

UNITED STATES PATENTS

| | | |
|---|---|---|
| 313,663 | Frazee | Mar. 10, 1885 |
| 2,597,213 | Whiteman | May 20, 1952 |
| 2,626,411 | Palmer | Jan. 27, 1953 |
| 2,788,751 | Russell | Apr. 16, 1957 |
| 2,817,102 | Harris | Dec. 24, 1957 |
| 2,880,431 | Noland | Apr. 7, 1959 |
| 3,006,008 | Loomis et al. | Oct. 31, 1961 |

FOREIGN PATENTS

| | | |
|---|---|---|
| 205,439 | Great Britain | Oct. 18, 1923 |
| 535,725 | Canada | Jan. 15, 1957 |
| 1,048,535 | Germany | Jan. 8, 1959 |